United States Patent [19]

Yello

[11] 4,300,076
[45] Nov. 10, 1981

[54] RASTER-CENTERING CIRCUIT FOR MULTIPLE RASTER CRT SYSTEMS

[75] Inventor: Joseph F. Yello, Wooddale, Ill.

[73] Assignee: Zenith Radio Corporation, Glenview, Ill.

[21] Appl. No.: 123,545

[22] Filed: Feb. 22, 1980

[51] Int. Cl.³ .............................................. H01J 29/54
[52] U.S. Cl. ...................................... 315/398; 358/60
[58] Field of Search ........................... 315/398; 358/60

[56] References Cited

U.S. PATENT DOCUMENTS 2,250,884 10/1938 Bahring .
2,470,197 9/1946 Torsch .
2,654,854 10/1953 Seright ................................. 358/60

FOREIGN PATENT DOCUMENTS 892349 3/1962 United Kingdom .

Primary Examiner—Theodore M. Blum

[57] ABSTRACT

In a color projection TV system using three cathode ray tubes (one for each of the primary colors green, red and blue), the vertical deflection coils of all three CRT's are capacitively coupled in a series string configuration so that they can be driven by a common amplifier. The capacitors provide AC coupling at the sweep frequency, but maintain DC isolation between the deflection coils. For raster-centering purposes various voltage divider configurations including adjustable resistances are used to establish adjustable DC levels at different ends of each coil. If any of these adjustable resistances are adjusted to apply a potential difference across any of the deflection coils, the result is a constant centering current flowing through each of those coils to maintain steady-state magnetic bias fields for vertical centering of the electron beams. In some configurations the sweep amplifier itself is part of the DC centering current path. All of the adjustable resistances associated with a given deflection coil are ganged in aiding relationship so far as their effect on the direction of beam centering is concerned, but the adjustable resistances for each CRT are adjustable independently of any other CRT to facilitate proper fusion of the three primary color images.

7 Claims, 6 Drawing Figures

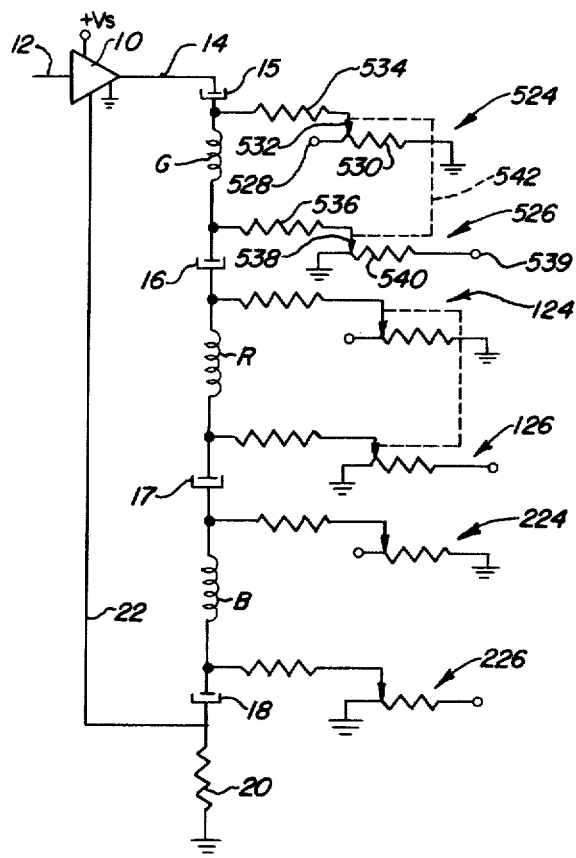
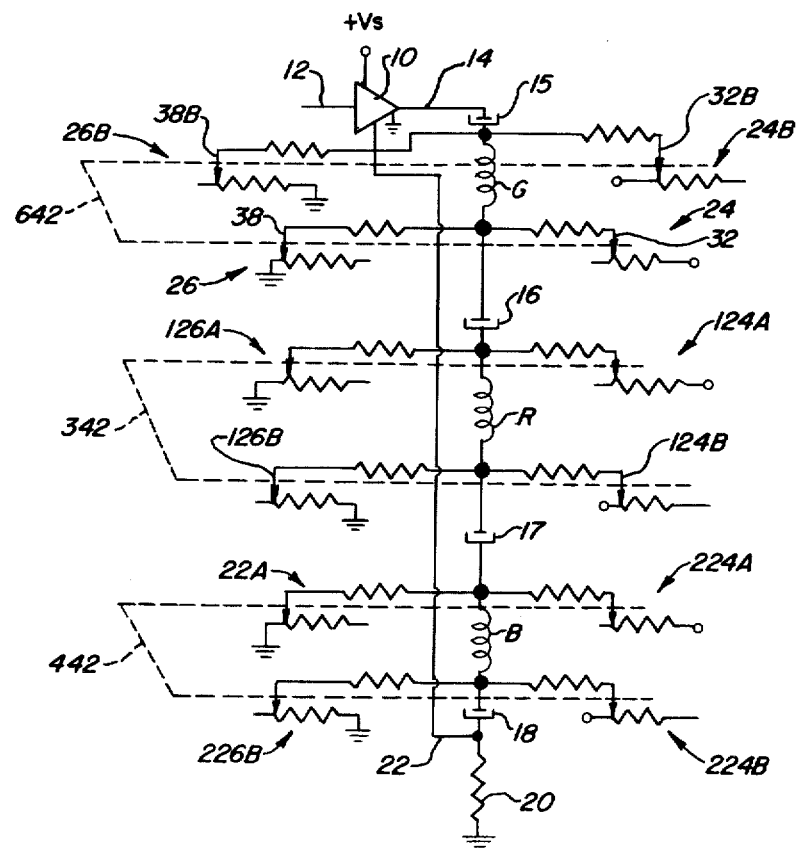
FIG. 3
FIG. 4

RASTER-CENTERING CIRCUIT FOR MULTIPLE RASTER CRT SYSTEMS

This invention relates generally to cathode ray tube circuits, and particularly concerns centering of CRT rasters.

RELATED APPLICATION

This application is related to my U.S. patent application Ser. No. 123,546 entitled "Raster-Centering Circuit" filed on the same day as this one.

BACKGROUND OF THE INVENTION

A cathode ray tube generates an image-producing raster by means of a pair of deflection yokes which sweep the electron beam in vertical and horizontal coordinates respectively. Although electrostatic deflection is known, most yokes deflect the beam magnetically. Typically they do this by driving a sawtooth current through a deflection coil to generate a varying magnetic field which deflects the beam across the tube face.

In order to center the raster upon the CRT screen, such magnetic deflection systems may superimpose a steady magnetic field upon the varying field in order to move the center position of the beam to the geometric center of the screen. Several ways of doing this are known.

One involves the use of permanent magnets to impose a DC magnetic bias upon the neck of the CRT. Such systems involve cumbersome mechanical means for adjusting the positions of the magnets.

Other approaches avoid these mechanical problems by generating a steady magnetic bias electrically. For example, a separate bias coil (not electrically connected to the deflection coil) may be mounted on the neck of the tube, and a constant current driven through this bias coil to generate a nonvarying magnetic bias field. The magnitude of the bias field is then easily adjusted electrically, by adjusting the level and direction of the current in the separate coil. But the provision of a separate bias coil adds to the expense of the cathode ray tube.

There is another electrical approach to the problem of beam centering, one which does not require a separate bias coil. This involves driving a constant bias current through the deflection coil itself, the constant current being superimposed upon the varying deflection current which generates the raster sweep. The advantage of the approach is that it makes the deflection coil do double duty. But in this type of system it is necessary to isolate the DC bias circuit from the AC sweep circuit. Prior art proposals for accomplishing this have envisioned the use of a transformer to isolate the bias supply from the sweep current source. The transformer adds weight and expense, and also necessitates additional components for rectifying and filtering the AC voltage which is taken from the secondary of the transformer.

The problem of centering is particularly acute in the case of multiple raster systems. One example of such a system is a common type of color projection TV set which employs a separate monochromatic picture tube for each of the three primary colors, these tubes all projecting their respective different-colored images upon a common reflector screen. In such a system the three different-colored images must all be centered with respect to each other, in order to avoid the undesirable fringing which results from non-fusion of the colors. Similar problems of multiple image alignment may arise in other contexts. In some systems a plurality of CRT's may be used to project completely different images, not simply different-colored versions of the same scene, upon a common viewing surface. For example, in a plan position indicator radar system one CRT may project an image of a map (or any other background information), while another projects a continuous image of the position of an aircraft relative to the map (or any other variable data which has position-significance relative to the background information). It is also possible that in some situations a plurality of deflection circuits may be associated with a single CRT for generating different images on a common tube face on a time-shared basis. See for example the radar plan position indicator system disclosed in U.S. Pat. No. 3,159,830 of Macauley.

In each of the above mentioned systems, or whenever multiple image rasters generated by different deflection circuits are combined into a single display for any purpose, the problem of mutual raster alignment arises.

In some multiple raster systems it may be desirable, for reasons of economy, to connect a plurality of deflection coils in a series string so that they can be driven by a common sweep amplifier. Yet at the same time the alignment problem (referred to above) makes it necessary for the series-connected deflection coils to be independently compensated for any errors in centering.

Accordingly, this invention contemplates an improved system for centering a magnetic CRT deflection circuit. The system is electrical, and therefore requires no permanent magnets or mechanical linkages. It uses the deflection coil itself for both sweep and bias, and so does not require a separate bias coil. It does not require a transformer for isolation, and thus also avoids the need for rectification and filtering of the bias supply.

The invention is best appreciated from the following discussion of several illustrative embodiments, which is to be taken in conjection with the accompanying drawings.

BRIEF DESCRIPTION OF THE DRAWINGS

FIG. 3 is a schematic circuit diagram of another alternative embodiment of a vertical deflection circuit in accordance with this invention.

FIG. 4 is a schematic circuit diagram of still another alternative embodiment of a vertical deflection circuit in accordance with this invention.

DETAILED DESCRIPTION OF THE PREFERRED EMBODIMENTS

Figure 1:
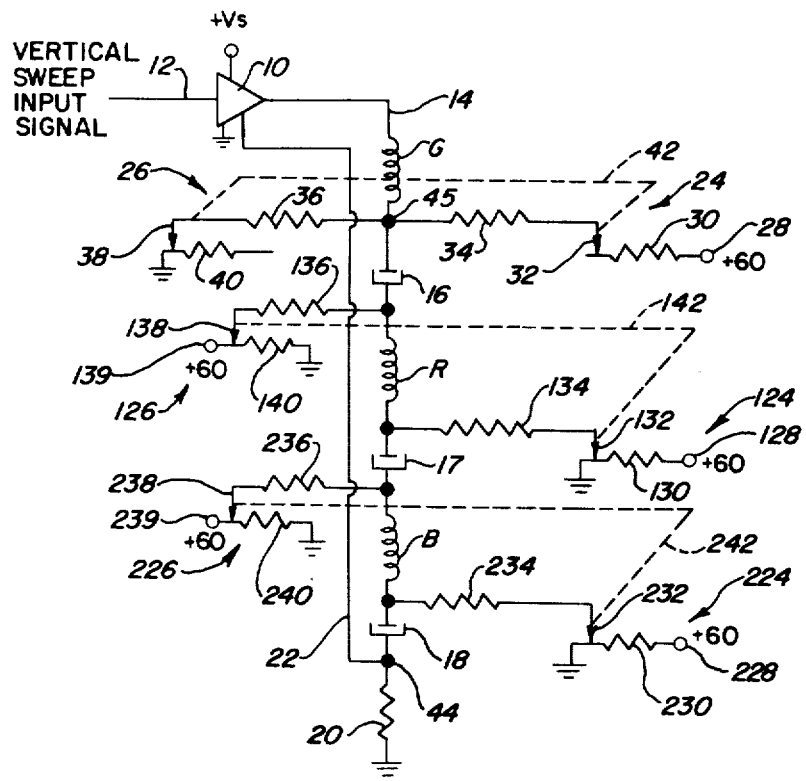
FIG. 1 is a schematic circuit diagram of a preferred embodiment of a vertical deflection circuit in accordance with this invention.

The present invention relates to both vertical and horizontal deflection circuits, but for purposes of illustration it will be described in connection with a vertical deflection circuit. In FIG. 1 there is seen the final output amplifier stage 10 of a vertical deflection circuit of a projection color television set or other multiple cathode ray tube display system. The input to the amplifier 10 is the vertical sweep signal appearing on a line 12. The amplifier output signal appears on line 14 and is applied to one end of a string of coils G, R and B which are coupled in series relationship by DC isolation capacitors 16 and 17. Coils G, R and B are the respective vertical deflection coils of separate green, red and blue picture tubes which project respective different-colored versions of a single image upon a common reflector screen. The other end of the coil string is connected through a DC isolation capacitor 18 and a sensing resistor 20 to ground. Components 16, 17, 18, 20, G, R and B comprise the vertical deflection yoke load driven by amplifier 10. A sensing signal is developed across the resistor 20 by the vertical deflection output, and this signal is fed back over a line 22 to the gain control port of the vertical deflection output amplifier 10 to improve linearity. As so far described, except for the capacitors 16, 17 and 18, the circuit is entirely conventional.

Figures 5A, 5B:
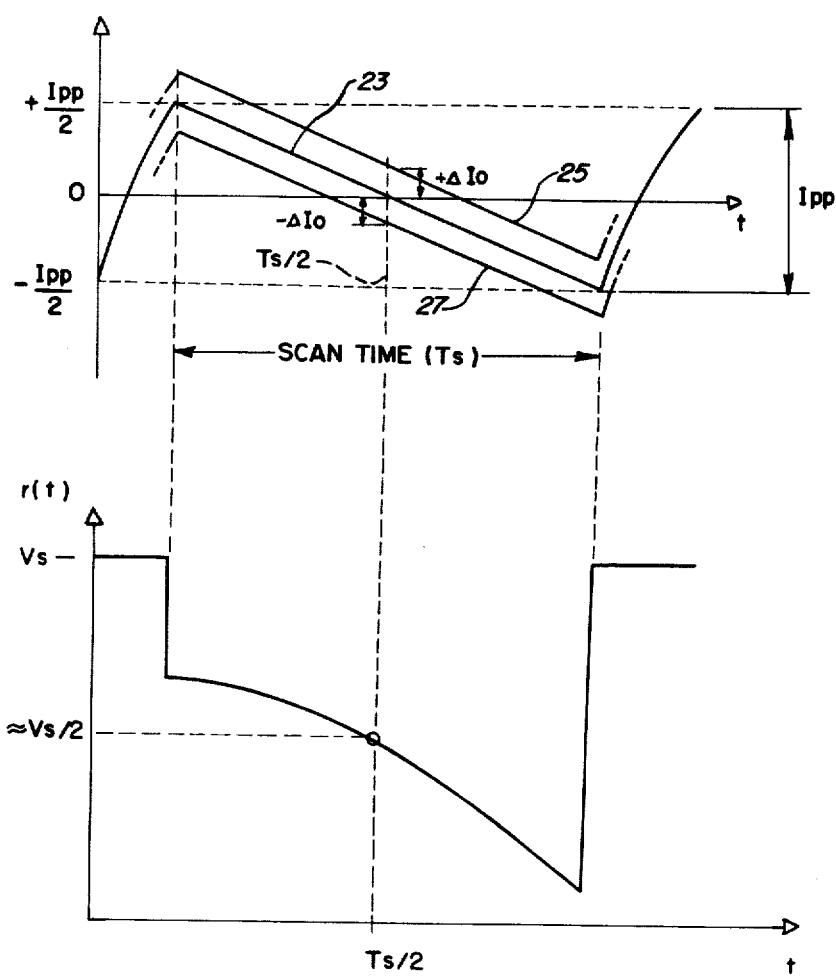
FIG. 5A is a vertical deflection yoke load current waveform.
FIG. 5B is a vertical deflection output voltage waveform, the time scale of which is correlated with FIG. 5A.

In FIG. 5A waveform 23 shows the yoke load current over a single vertical beam deflection trace. When the load current rises to a positive peak $I_{pp}/2$, the electron beams of the three picture tubes are all vertically deflected to one edge of each screen for the start of a raster scan. When the load current declines to zero, the beams are approximately in the centers of the screens and the raster scan is half completed. Finally, when the load current swings to its negative peak $-I_{pp}/2$, the beams are vertically deflected to the opposite edge of each screen for the conclusion of the raster scan. The capacitors 16, 17 and 18 have values such that they present low impedances at the frequency of the AC vertical deflection signal.

If any of the three rasters produced by the varying deflection current flowing through the coils G, R and B is not centered between the top and bottom of its particular CRT screen, then some sort of adjustment is needed to shift the center position, i.e. the zero deflection current position, of that electron beam so that it is in the center of the screen. In the circuit of this invention this is accomplished by generating a steady-state magnetic field, which is superimposed upon the alternating magnetic field generated by the deflection current provided by the output amplifier 10. The most economical way to accomplish this is to use the deflection coil G, R and/or B itself to produce the steady-state bias field. This can be achieved by driving a steady-state bias current through the particular deflection coil so that it is superimposed upon the sawtooth deflection current (waveform 23) of FIG. 5A. As a result, the yoke load current shifts from waveform 23, which has a value $I_0$=zero at center-scan time $T_s/2$, to waveform 25 (for one direction of centering correction) or waveform 27 (for the opposite direction of centering correction), so that the center-scan current value shifts by plus or minus $\Delta I_0$ respectively. Both the magnitude and the direction of the bias current must be controlled, because its direction determines the direction of the centering deflection exerted upon the electron beam by the magnetic bias field, and its magnitude determines the extent of such beam deflection.

Because of individual production variations, neither the extent nor the direction of the bias correction needed for a given picture tube can be predicted in advance. Therefore, the centering current must be able to be adjusted through a range of positive and negative values, that is to say from a maximum bias current in one direction through zero to a maximum bias current in the other direction. A positive bias current deflects the beam in one direction by an amount proportional to the magnitude of the current, and a negative bias current deflects the beam in the opposite direction by an amount proportional to its negative magnitude. If no correction is needed, the bias current must be zero.

Concentrating first on the deflection circuit for the green picture tube, in accordance with the present invention coil G has connected to it two circuit sections 24 and 26 which perform the vertical centering function for the green picture. It will be helpful to think of the constant bias current running through deflection coil G as the net resultant of two steady-state current components flowing in opposite directions through the coil. Section 24 is responsible for driving a first constant current in one direction through the deflection coil G, while section 26 is responsible for driving a second constant current in the opposite direction through deflection coil G. Section 24 comprises a positive DC voltage source 28 which is greater than the center-scan deflection voltage $V_s/2$ in FIG. 5B (i.e. V exceeds $V_s/2$). This potential is applied to one end of a potentiometer 30, while the other end of the potentiometer is open-circuited. The potentiometer has a wiper 32 which is connected through a current-limiting resistor 34 to the "bottom" end of the deflection coil G. As a result, the voltage difference $V - V_s/2$ causes a steady-state current to flow through the potentiometer 30, its wiper 32, the limiting resistor 34, and the deflection coil G, to the output terminal of the vertical sweep amplifier 10. Amplifier 10 is a conventional vertical output stage, the output of which is not limited to uni-directional current flow; current can flow inward to the output port of the amplifier 10 as well as outward therefrom.

The other circuit section 26 comprises a current-limiting resistor 36 leading from the bottom end of the deflection coil G to the wiper 38 of another potentiometer 40. One end of potentiometer 40 is open-circuited, while the other end is grounded. Because of the potential difference between the positive output voltage of amplifier 10 and ground, circuit section 26 draws current from the amplifier 10 through the deflection coil G, the limiting resistor 36, the wiper 38 and the potentiometer 40 to ground. This latter current is a steady-state current, superimposed upon the varying deflection current which the amplifier 10 drives through the deflection coil G, capacitor 16, deflection coil R, capacitor 17, deflection coil B, capacitor 18 and resistor 20 to ground.

Note that the DC isolation capacitor 16, although it presents a low impedance to the sawtooth sweep current flowing through the deflection coil G, presents essentially an infinite impedance to the two direct currents which flow through the coil G as a result of circuit section 24 and 26. Stated another way, the capacitor 16 isolates the DC voltage level produced at circuit point 45 by circuit sections 24 and 26 from deflection coils R and B, the sensing resistor 20 and the sensing line 22.

Using the standard conventions for current direction, it will be seen that the constant current provided by circuit section 24 flows "upwardly" through the deflection coil G, and is thus opposed to the constant current provided by circuit section 26, which flows "downwardly" through the coil G. If these two constant currents are equal in magnitude, the net constant current flowing through coil G will be zero. But if either current exceeds the other, then the direction of the net constant current will be the direction of the larger component, and its magnitude will be equal to the differences in magnitudes between the two components. In any case, the net constant current will be superimposed upon the alternating deflection current which flows through the deflection coil G.

For a given direction (or polarity) of the net constant current flowing through the deflection coil G, the rest position of the green electron beam (i.e. the position of that beam at time $T_S/2$) will be shifted in one vertical direction on the green CRT screen by an amount proportional to the magnitude of the net constant current, e.g. $+\Delta I_0$. For the opposite polarity of the net constant current, the rest position of that beam will be shifted in the opposite vertical direction by an amount which is again proportional to the net current magnitude, in this case $-\Delta I_0$. Thus, by choosing the direction (i.e. polarity) of the net constant current, the electron beam can be shifted up or down to correct for any initial inaccuracies. The amount of the correction can be controlled by adjusting the magnitude of the net constant current.

These adjustments are made by means of a manual control knob and a suitable gang linkage which drives both of the potentiometer wipers 32 and 38 together. This mechanism is schematically represented by the dashed line 42 which indicates that the two potentiometer wipers 32 and 38 are ganged for simultaneous operation in response to an appropriate manual control device. In addition, the circuit diagram is drawn so that the wipers 32 and 38 both appear at the same (i.e. left) ends of their respective potentiometers 30 and 40 at the same time; this is intended to indicate that when the gang control 42 is operated, the potentiometer wipers 32 and 38 either move simultaneously to the right or simultaneously to the left relative to the view of FIG. 1.

The DC voltage source 28 and ground are connected to opposite (i.e. right and left) ends of their respective potentiometers 30 and 40. Therefore, when the gang control 42 is operated in one direction, the effective resistance of potentiometer 30 which is in series with one of the two constant currents decreases, while at the same time the effective resistance of potentiometer 40 which is in series with the other one of the constant current components increases. As a result, the constant current component provided by circuit section 24 increases, because of the decreasing series resistance of potentiometer 30. At the same time, the opposite constant current component decreases, because of the increasing series resistance of potentiometer 40 in circuit section 26. It follows that the effects of the simultaneous changes in the series resistances of potentiometers 30 and 40 are aiding. One change tends to increase the upward current component while the simultaneous change tends to decrease the downward current component. If the upward direction is arbitrarily defined as positive, both of these effects tend to shift the value of the net constant current in the positive direction; i.e. making it either less negative or more positive.

Conversely, when the gang control 42 is operated in the opposite direction, the series potentiometer resistance in circuit section 24 increases and the series potentiometer resistance in circuit 26 decreases. This tends to decrease the upward current component and increase the downward current component flowing through the deflection coil G. Both of these changes tend to shift the net constant current in the deflection coil in the negative direction; i.e. more negative or less positive.

In sum, the gang control 42 causes the potentiometers 30 and 40 to aid each other so that the constant current in the deflection coil is shifted maximally either in the positive or the negative direction. In this way the steady-state magnetic bias imposed upon the electron beam can also be made more positive or more negative as desired. Since the net constant current flowing through the deflection coil G can be shifted to either side of zero, the magnetic bias can be made to point up or down, giving the user a choice of upward or downward beam centering corrections. Thus, if the rest position os the green beam is too low, the net constant current can be adjusted to flow in the appropriate direction for biasing the beam up toward the center of the green screen; whereas if the rest position of the green beam is too high, the opposite net constant current direction can be employed for biasing the beam down toward the center of the green screen.

Another way of analyzing the operation of the circuit seen in FIG. 1 is to view circuit sections 24 and 26 as providing a voltage divider. That is to say, that the total DC voltage appearing between terminal 28 and ground is divided between the variable resistance of potentiometer 30 and the fixed resistance of resistor 34 on the one hand, and the fixed resistance of resistor 36 and the variable resistance of potentiometer 40 on the other hand. This divided voltage appears at circuit point 45, i.e. at the bottom end of the deflection coil G. The positive DC voltage which the voltage divider establishes at circuit point 45 is effectively isolated from coils R and B and resistor 20 and line 22 by capacitor 16, but it is not isolated from deflection coil G and the output terminal of amplifier 10. Therefore, depending upon the exact value of the DC voltages at circuit point 45 and at the average output voltage of amplifier 10, the voltage divider will either drive DC current "upwardly" through the deflection coil G into the output terminal of the amplifier 10 or will draw current "downwardly" through the deflection coil G from the output terminal of the amplifier 10. In either case, there will be a constant current of some polarity and magnitude flowing through the coil G unless the DC voltage at circuit point 45 is exactly equal to the average voltage at the output terminal of the amplifier 10.

The exact value of the DC voltage at circuit point 45, moreover, is adjustable by the gang control 42 when it shifts the potentiometer wipers 32 and 38 in the manner described above. When these wipers move to the right relative to FIG. 1, less of the total voltage drop will occur across potentiometer 30 and more of it will occur across potentiometer 40. Accordingly, the voltage of circuit point 45 will shift in the positive direction. Conversely, when the gang control 42 is operated to move the potentiometer wipers 32 and 38 to the left relative to FIG. 1, then the result will be to drop more of the voltage across potentiometer 30 and less of it across potentiometer 40. That will cause the voltage of circuit point 45 to shift in the negative direction. Note again that the effects of the simultaneous motions of the potentiometer wipers 32 and 38 are aiding so far as the DC current flowing through the deflection coil G is concerned.

So far only the vertical centering circuit for the green picture tube G has been discussed. According to this invention, constant centering currents are driven through the red vertical deflection coil R and the blue vertical deflection coil B as well, for vertical centering of the red and blue pictures. All three of the different-colored images must be mutually centered, or color fringing will occur at the reflection screen of the color projection TV system. Moreover, the centering controls for the three different-colored images must operate independently of each other (despite the series connection of coils G, R and B), because color fringing can be eliminated only if each of the color images can be shifted relative to the other two whenever necessary.

Because of the DC isolation effect of the capacitor 16, the vertical deflection amplifier 10 cannot be used as a source or sink for the steady bias current of the red deflection coil R. The same is true for the blue deflection coil B, because of the DC isolation effect of both capacitors 16 and 17. In addition, it would be inadvisable for the centering current of the red coil R to flow through the green coil G, or for the centering current of the blue coil B to flow through the red coil R and the green coil G, on their way to or from the vertical deflection amplifier 10. That would prevent the three different-colored images from being centered completely independently of each other. A blue image shift would move the red and greem images with it, and a red image shift would move the green one with it. Removal of a blue color fringe relative to red or green, and removal of a red color fringe relative to green, would not be possible.

To avoid this, the red deflection circuit is provided with two centering sections 124 and 126, and these sections along with the red deflection coil R are DC-isolated at both ends of the coil by the capacitors 16 and 17. Similarly the blue deflection circuit is provided with two centering sections 224 and 226, and these sections along with blue deflection coil B are DC-isolated at both ends of the coil by the capacitors 17 and 18. In this manner the constant centering current of each deflection coil G, R and B is prevented from reaching any of the other deflection coils.

Circuit sections 124, 126, 224 and 226 are identical. They include respective voltage dividers in the form of potentiometers 130, 140, 230 and 240 which are connected directly between ground potential and respective DC voltage sources 128, 139, 228 and 239. Respective potentiometer wipers 132, 138, 232 and 238 adjustably pick off intermediate voltage levels. The voltages selected at the potentiometer wipers are connected through respective current-limiting resistors 134, 136, 234 and 236 to respective ends of the deflection coils R and B. Specifically, circuit sections 124 and 234 are connected to the "bottom" ends of their respective coils R and B, while circuit sections 126 and 226 are connected to the "top" ends of the coils R and B respectively. Thus, for the red deflection coil R, the magnitude and direction of the constant centering current flowing therethrough depends on the magnitude and polarity of the differential between the voltages selected by its "top" and "bottom" wipers 138 and 132 respectively. Similarly, the magnitude and direction of the constant centering current flowing through the blue deflection coil B depends on the magnitude and polarity of the differential between the voltages selected by its "top" and "bottom" wipers 238 and 232. But the two constant centering currents can be selected independently of each other, and independently of the constant centering current in the green deflection coil G.

The potentiometer wipers 132 and 138 for the red deflection coil R are ganged, as indicated by dashed line 142; while the potentiometer wipers 232 and 238 for the blue deflection coil B are similarly ganged as indicated by dashed line 242. (But the red and blue gang controls 142 and 242 are adjustable independently of each other, and of the green gang control 42.) The ganged pair of wipers 132 and 138 for coil R are both shown at the same (i.e. left) side of their respective potentiometers 130 and 140, indicating that they move simultaneously to the left and simultaneously to the right, with respect to FIG. 1. The same is true of the other ganged pair of potentiometer wipers 232 and 238 for coil B, with respect to 230 and 240. But high voltage is connected to opposite sides of each pair of potentiometers; i.e. potentiometers 130 and 140 of coil R have voltage sources 128 and 139 respectively connected to their opposite (right and left) sides; and potentiometers 230 and 240 of coil B also have voltage sources 228 and 239 respectively connected to their opposite (right and left) sides. As a result, when the gang control 142 is operated in any direction, the respective voltages picked off by its pair of wipers 132 and 138 change in opposite directions; one increases while the other decreases. The same is true of gang control 242 and its pair of wipers 232 and 238. This in turn means that the changes in the contant current through coil R produced by adjustment of its "lower" potentiometer 130 are aided by the concomitant changes in the constant current through coil R produced by adjustment of its other ("upper") potentiometer 140. Thus, if "up" is arbitrarily selected as the positive direction of current flow, when the voltage at the bottom of coil R goes higher and the voltage at the "top" of that coil simultaneously goes lower, both effects tend to product a positive-going change in the constant current through coil R (i.e. the current will become more positive or less negative), and vice-versa when the opposite voltage changes occur simultaneously. The same is true of coil B and its potentiometers 230 and 240. It follows that any given adjustment of the red gang control 142 or the blue gang control 242 produces maximal effect on the constant current flowing through its red deflection coil R or blue deflection coil B, just as the green gang control 42 does with the green deflection coil G. If no beam centering correction is needed for one of the rasters, the constant current in the corresponding deflection coil G, R or B is set to zero.

Thus, by manipulating the appropriate gang control 142 or 242, the rest position of the red or blue beam can be adjusted up or down relative to the center of the red or blue CRT screen, just as the gang control 42 vertically adjusts the rest position of the green beam. Moreover, each gang control 42, 142 and 242 produces its effects independently of the other two, since it controls only the constant centering current in its own deflection coil G, R or B, and these DC currents are isolated from each other by capacitors 16 and 17, except for the possibility of very slight cross-talk or circuit loading only during the brief interval when one of these constant currents is being adjusted by its gang control 42, 142 or 242. Thus the economy of a series-string deflection coil configuration need not be sacrificed in order to achieve independent centering of the three primary TV colors.

The operation of the centering circuits for the red deflection coil R and the blue deflection coil B has been described in terms of the magnitude and polarity of the voltage differential between the "top" and "bottom" potentiometer wipers for each coil. But it can also be understood in terms of the net constant current produced by two constant current components flowing through each of the coils in opposite directions. Thus, one constant current component may be considered to flow "up" through the red coil R from terminal 128, potentiometer 130, wiper 132 and limiting resistor 134 to limiting resistor 136, wiper 138 and potentiometer 140 to ground; while an opposed constant current compound may be considered to flow "down" through that coil from terminal 139, potentiometer 140, wiper 138 and resistor 136 to resistor 134, wiper 132 and potentiometer 130 to ground. Similar current paths can be traced for the blue deflection coil B.

Figure 2:
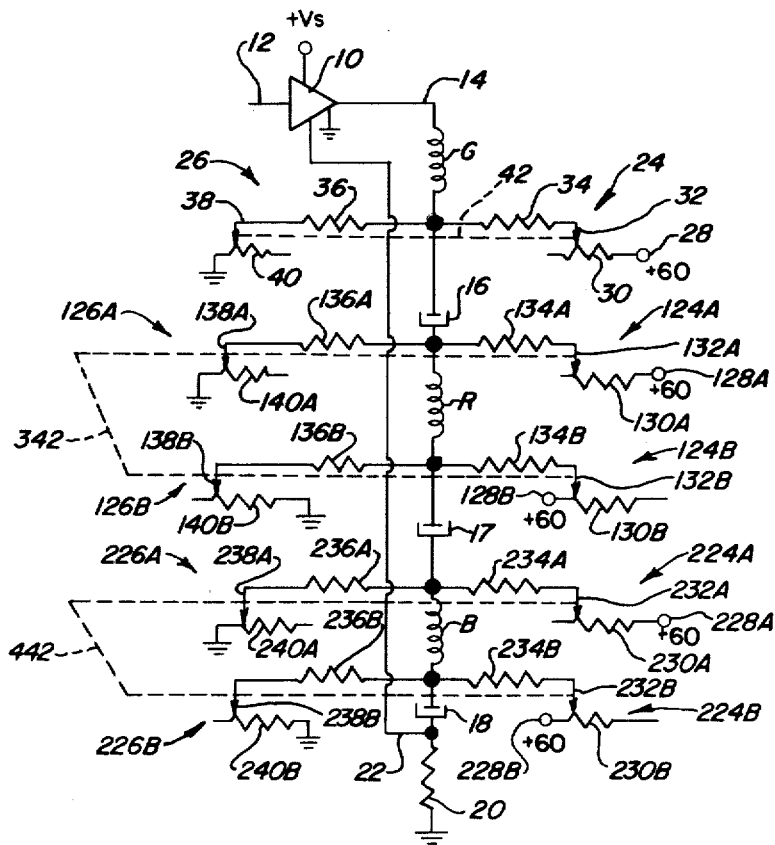
FIG. 2 is a schematic circuit diagram of an alternative embodiment of a vertical deflection circuit in accordance with this invention.

FIGS. 2 through 4 are similar in circuit operation, but differ in some respects in circuit configuration. Thus, in FIG. 2 the centering sections 24 and 26 for the green deflection coil G are unchanged, but there are four centering sections for each for the red and blue deflection coils. The red coil R has a pair of centering sections 124A and 126A connected to the "top" end thereof, and another pair of centering sections 124B and 126B connected to the "bottom" end thereof. Similarly, the blue deflection coil B has a pair of centering sections 224A and 226A connected to the "top" end thereof, and another pair of centering sections 224B and 226B connected to the "bottom" end thereof. Each pair of centering sections 124A-126A, 124B-126B, 224A-226A, and 224B-226B which is connected in common to one end of one of the red or blue deflection coils R or B is identical in circuit configuration with the pair of centering sections 24-26 which is connected to the "bottom" end of the green deflection coil G; and operates in very much the same fashion with respect to its particular deflection coil R or B as the pair of centering sections 24-26 does with respect to its deflection coil G. Analyzing the circuit in terms of constant current components flowing in opposite directions, the pairs of circuit sections 124B-126B and 224B-226B which are connected to the "bottom" ends of their respective coils R and B cause respective "upward" constant current compnents to flow in those coils, just as circuit sections 24 and 26 do in the case of coil G, while those pairs of circuit sections 124A-126A and 224A-226A which are connected to the "top" ends of their respective coils R and B cause respective "downward" constant current components to flow therein. The actual constant current in each deflection coil R and B is the net resultant of these two opposed components.

Alternatively, the operation of circuit sections 124A and B, 126A and B, 224A and B, and 226A and B can also be described in terms of a single constant current flowing through each coil R and B, the magnitude and polarity of which depends on the magnitude and polarity of a voltage differential placed across that coil by its respective centering sections 124A and B and 126A and B, or 224A and B and 226A and B. Each pair of centering sections connected to a common end of one of the coils represents a voltage divider which applies an adjustable DC voltage to that end of the coil. For example the voltage divider for the "top" end of the red coil R comprises voltage source 128A, potentiometer 130A, wiper 132A, resistors 134A and 136A, wiper 138A, potentiometer 140A, and ground, while the precise value of the DC voltage applied to the "top" end of coil R by that voltage divider depends on the settings of the potentiometers 130A and 140A thereof. A similar analysis applies to the voltage divider connected to the "bottom" end of coil R, which comprises sections 124B and 126B; to the voltage divider connected to the "top" end of coil B, which comprises sections 224A and 226A; and to the voltage divider connected to the "bottom" end of coil B, which comprises sections 224B and 226B. The relative settings of their respective top and bottom voltage dividers determine the voltages across each of the coils R and B.

In addition, the aiding relationship of the potentiometers (described above in connection with FIG. 1) is preserved in FIG. 2 in the following fashion. All four of the potentiometers 130A, 130B, 140A and 140B associated with the red coil R are ganged to a control 342; while all four of the potentiometers 230A, 230B, 240A and 240B associated with the blue coil B are ganged to another control 442. But the two gang controls 342 and 442 are operable independently of each other and of the green control 42. All four of the potentiometer wipers which are ganged to any of the controls 342 or 442 move simultaneously to the left or simultaneously to the right with respect to FIG. 2. But the electrical polarities of the "top" and "bottom" voltage dividers of each coil are reversed. For example, voltage sources 128A and 128B are connected to opposite (i.e. right and left) sides of their respective ganged potentiometers 130A and 130B. Consequently, when the "top" potentiometer wipers 132A and 138A of coil R both move to the right with respect to FIG. 2, both of those changes increase the voltage at the "top" end of that coil; while the simultaneous rightward movement of the "bottom" potentiometer wipers 132B and 138B of that same coil both cause the voltage at the "bottom" end thereof to decrease. The increase at the top and simultaneous decrease at the bottom both cause the DC voltage differential across the coil R, and the constant centering current flowing through it, to increase. The same is true for the potentiometer wipers 232A and B and 238A and B which are associated with blue coil B. Therefore, each gang control 342 and 442 controls its respective four potentiometers in a manner to produce aiding changes in the constant centering current for its respective deflection coil R or B. Thus, the circuit of FIG. 2 functions in the same way, with respect to beam centering, as does the circuit of FIG. 1 described above.

In the embodiments of FIGS. 1 and 2, the amplifier 10 serves not only as a source for the alternating sweep current which flows through the green deflection coil G, but in addition it cooperates with circuit section 24 and 26 in driving the two constant current components in opposite directions through the deflection coil. A different approach, one which produces a similar result but does not use the sweep amplifier 10 as part of the centering circuit for the green coil G, is seen in FIG. 3.

Once again the vertical sweep signal on line 12 is boosted by amplifier 10 and outputted over line 14 to apply a sawtooth deflection current to coil 16, isolation capacitor 18, and sensing resistor 20, while the sensing line 22 returns from the high voltage end of resistor 20 to the gain control and linearity input of the amplifier 10. Here, however, there is also an additional capacitor 15 connected between the output of amplifier 10 and the green deflection coil G. This capacitor 15 provides a low impedance for the sawtooth deflection current, but it serves to provide DC isolation between the output of the amplifier 10 and the green deflection circuit. Here, just as in FIG. 1, there are the same circuit sections 124 and 126 connected to the "top" and "bottom" ends respectively of the red coil R, and circuit sections 224 and 226 connected to the top and bottom ends respectively of the blue coil B. But here, unlike FIG. 1, the green deflection coil G also has both top and bottom deflection circuits 524 and 526 which correspond to circuits 124 and 126 of coil R and circuits 224 and 226 of coil B. Circuit section 524 includes voltage source 528 connected through potentiometer 530 to ground. The potentiometer has a wiper 534 which is connected through resistor 534 to one end of the coil G. Another circuit section 526 includes voltage source 539, potentiometer 540, wiper 538 and resistor 536. Both sections 524 and 526 are identical in circuit configuration and operation to sections 124, 126, 224 and 226 described above. The major operational difference here is that in FIG. 3 circuit section 524 takes the place of amplifier 10 in establishing the potential at the "top" end of the green coil G. Also, circuit section 526 of FIG. 3 employs the more economical one-potentiometer voltage divider configuration employed in sections 24 and 26 of FIG. 1, to establish the DC potential at the "bottom" end of the green coil G.

By now it will be readily appreciated that the constant centering current flowing through green coil G of FIG. 3 can be explained either by a two-opposing-current-component analysis or by a voltage-differential analysis, as was done for the circuits of FIGS. 1 and 2 above. In the voltage divider analysis, the magnitude and polarity of the constant current flowing through deflection coil 16 depends upon the magnitude and polarity of the voltage difference between potentiometer wipers 532 and 538. These potentiometer wipers are ganged together by a control mechanism schematically illustrated by the dashed line 542, so that they move conjointly to the right or conjointly to the left, depending upon the direction in which the control 542 is operated. Furthermore, FIG. 3 is arranged so that the high voltage end of potentiometer 530 is at the left, while the high voltage end of potentiometer 540 is at the right; this is intended to indicate that when the potentiometer wipers 532 and 538 move conjointly to the right, the voltage on wiper 532 decreases at the same time that the voltage on wiper 538 increases. The converse is true when these potentiometer wipers move conjointly to the left. As a result, the effects of the conjoint potentiometer adjustments are aiding so far as the constant current in deflection coil G is concerned.

FIG. 3 can also be analyzed by thinking of the constant centering current in deflection coil G as the net resultant of two components flowing in opposite directions. One of these is the current flowing from voltage source 528 through potentiometer 530, wiper 532, resistor 534, downward through deflection coil G and then through resistor 536, wiper 538 and potentiometer 540 to ground. The other component flows from voltage source 539 through potentiometer 540, wiper 538, resistor 536, upwardly through deflection coil G and then through resistor 534, wiper 532 and potentiometer 530 to ground.

The alternative embodiment of FIG. 4 is similar to FIG. 3 in that both circuits DC-isolate the amplifier 10 from coil G by means of capacitor 15, and must therefore use an additional pair of centering circuit sections 24B and 26B to establish the DC voltage at the "top" end of that coil. But here each pair of centering sections at each end of each deflection coil G, R and B uses the less economical two-potentiometer voltage-divider configuration of FIG. 2 instead of the more economical one-potentiometer voltage-divider configuration of FIG. 3. This circuit configuration has been fully described above in connection with FIG. 2. Here we have exactly the same pairs of centering sections 124A-126A and 124B-126B for the "top" and "bottom" ends respectively of coil R, 224A-226A and 224B-226B for the top and bottom ends respectively of coil B, and 24-26 for the bottom end of coil G, as described above, while the pair of centering sections 24B-26B for the top end of coil G is identical to all the other pairs of centering sections in FIG. 4.

Dashed line 642 indicates that the two lower potentiometer wipers 32 and 38 are ganged with each other and with the two upper potentiometer wipers 32B and 38B. All four of these potentiometer wipers move conjointly to the right or conjointly to the left, depending upon the direction of operation of the gang control 642. The voltage polarities, as before, are connected so that all simultaneous potentiometer changes are in aiding relationship as described above.

The embodiment of FIG. 4 is subject to both the opposing current analysis and the voltage-divider analysis as spelled out above in connection with the other embodiments.

In the circuit of this invention, the resistive power dissipation in each deflection coil depends on the magnitude of the steady centering current flowing in the coil. Statistically, the number of instances in which large centering corrections are required will be small, and therefore, deflection coil dissipation will be of acceptable proportions on the average. As to power dissipation in the potentiometers, this is maximized when the potentiometers are relatively close to either of their extreme positions (about 10% of the way from either extreme position toward the center position). Since these settings are also statistically improbable, here again the power dissipation considerations are, on the average, favorable.

It is desirable, in each embodiment of the invention, for all of the potentiometers employed in all the centering sections of the circuit to be of the same resistance value and taper. Otherwise the user would not necessarily obtain the same degree of beam centering correction for a given rotation of a given centering control in one direction as for the same amount of rotation of the same centering control in the opposite direction. Such asymmetry should be avoided.

It is also desirable for all the potentiometers of all the centering sections of all three CRT's G, R and B to be connected to a common voltage source, because then, in case of any voltage instability, all the centering currents will track with each other, preventing any color misconvergence.

It will now be appreciated that the present circuit provides a convenient and inexpensive means of beam centering which does not require permanent magnets or mechanical linkages. Instead, it has all the advantages of other electrical adjustment techniques, but does not require transformer isolation, rectification, or filtering. Moreover it provides independent mutual centering of a number of different rasters which cooperate to produce a common visual display, even where the deflection coils are connected in an economical series string configuration to be driven by a common amplifier.

The various embodiments of the invention described in detail above are merely exemplary, and it is possible that the principles of the invention may be embodied in other specific circuits. Accordingly, the scope of protection afforded this invention is to be limited only by the appended claims.

I claim:

1. A cathode ray tube raster-generating and centering circuit of the type having at least two deflection coils capacitively coupled in series with each other; said circuit comprising:

one or more means for (a) driving a varying current through said series-connected deflection coils for generating said rasters and (b) driving two constant currents through one of said deflection coils in opposite directions so that the net constant current in said one deflection coil depends on the relative magnitudes of said two constant currents;

means for adjusting said two constant currents in inverse relation to each other, so that the resulting adjustments of said two constant currents are additive in their effects on said net constant current;

means for driving another two constant currents through another of said deflection coils in opposite directions so that the net constant current in said other deflection coil depends on the relative magnitudes of said other two constant currents;

and means for adjusting said other two constant currents in inverse relation to each other, so that the resulting adjustments of said other two constant currents are additive in their effects on said net constant current in said other deflection coil;

said two adjusting means both being arranged so that the ranges of adjustment of their respective net constant currents both extend to both sides of zero, whereby both of said rasters may be shifted in either of two opposite directions for centering purposes.

2. A circuit as in claim 1 wherein each of said adjusting means comprises an adjusting device in series with one of its respective two constant currents, another adjusting device in series with the other of its respective constant currents, and control means operating said adjusting devices in opposite directions.

3. A circuit as in claim 2 wherein said adjusting devices are variable resistances and each of said control means is a gang control which increases one of its respective resistances while simultaneously decreasing the other and vice versa.

4. A cathode ray tube raster-generating and centering circuit of the type having at least two deflection coils capacitively coupled in series with each other; said circuit comprising:

one or more means for (a) driving a varying current through said series-connected deflection coils for generating said rasters and (b) driving two constant currents through one of said deflection coils in opposite directions so that the net constant current in said one deflection coil depends on the relative magnitudes of said two constant currents;

means for adjusting said two constant currents in inverse relation to each other, so that the resulting adjustments of said two constant currents are additive in their effects on said net constant current;

means for driving another two constant currents through another of said deflection coils in opposite directions so that the net constant current in said other deflection coil depends on the relative magnitudes of said other two constant currents;

and means for adjusting said other two constant currents in inverse relation to each other, so that the resulting adjustments of said other two constant currents are additive in their effects on said net constant current in said other deflection coil;

said two adjusting means both being arranged so that the ranges of adjustment of their respective net constant currents both extend to both sides of zero, whereby both of said rasters may be shifted in either of two opposite directions for centering purposes;

said means for driving said varying current comprising a sweep output amplifier DC-coupled to one end of said deflection coils;

said means for driving said two constant currents through one of said deflection coils comprising said sweep output amplifier, a DC voltage source, a ground, a variable resistance connected in series with said DC voltage source to the other end of said one deflection coil, and another variable resistance connected in series with said ground to said other end of said one deflection coil;

whereby one of said two constant currents of said one deflection coil flows between said DC voltage source and said sweep output amplifier by way of said one deflection coil and the other of said constant currents thereof flows between said ground and said sweep output amplifier by way of said one deflection coil;

and said adjusting means of said one deflection coil comprising said variable resistances and a control device ganging said variable resistances together for mutually inverse operation.

5. A circuit as in claim 4 wherein: said means for driving said two constant currents through the other of said deflection coils comprises a pair of voltage dividers, means for applying a DC voltage across each of said voltage dividers, and respective taps on each of said voltage dividers adjustable to tap off respective selected voltages therefrom, means coupling one of said adjustable taps to one end of said other deflection coil, and means coupling the other of said adjustable taps to the other end of said other deflection coil whereby the DC voltage across said coil depends on the relative positions of said adjustable taps on their respective voltage dividers; and said adjusting means of said other deflection coil comprises said adjustable taps and a control device ganging said adjustable taps together for mutually inverse operation.

6. A multiple cathode ray tube image projection system comprising:

a projection screen;

a plurality of cathode ray tubes arranged to project respective images upon said projection screen;

said cathode ray tubes having respective raster-generating circuits including respective deflection coils;

means capacitively coupling said deflection coils in series;

one or more means for (a) driving a varying current through said series-connected deflection coils for generating said rasters and (b) driving two constant currents through one of said deflection coils in opposite directions so that the net constant current in said one deflection coil depends on the relative magnitudes of said two constant currents;

means for adjusting said two constant currents in inverse relation to each other, so that the resulting adjustments of said two constant currents are additive in their effects on said net constant current;

means for driving another two constant currents through another of said deflection coils in opposite directions so that the net constant current in said other deflection coil depends on the relative magnitudes of said other two constant currents;

and means for adjusting said other two constant currents in inverse relation to each other, so that the resulting adjustments of said other two constant currents are additive in their effects on said net constant current in said other deflection coil;

said two adjusting means both being arranged so that the ranges of adjustment of their respective net constant currents both extend to both sides of zero, whereby both of said rasters may be shifted in either of two opposite directions for centering purposes.

7. A system of one or more cathode ray tubes arranged for generating a plurality of images in superposed relation; comprising:

a plurality of raster-generating circuits having respective deflection coils;

means capacitively coupling said deflection coils in series;

one or more means for (a) driving a varying current through said series-connected deflection coils for generating said rasters and (b) driving two constant currents through one of said deflection coils in opposite directions so that the net constant current in said one deflection coil depends on the relative magnitudes of said two constant currents;

means for adjusting said two constant currents in inverse relation to each other, so that the resulting adjustments of said two constant currents are additive in their effects on said net constant current;

means for driving another two constant currents through another of said deflection coils in opposite directions so that the net constant current in said other deflection coil depends on the relative magnitudes of said other two constant currents;

and means for adjusting said other two constant currents in inverse relation to each other so that the resulting adjustments of said other two constant currents are additive in their effects on said net constant current in said other deflection coil;

said two adjusting means both being arranged so that the ranges of adjustment of their respective net constant currents both extend to both sides of zero, whereby both of said rasters may be shifted in either of two opposite directions for centering purposes.

* * * * *